(12) United States Patent
Zhai et al.

(10) Patent No.: US 11,017,275 B2
(45) Date of Patent: May 25, 2021

(54) METHOD AND APPARATUS FOR MULTI-SCALE SAR IMAGE RECOGNITION BASED ON ATTENTION MECHANISM

(71) Applicant: WUYI University, Guangdong (CN)

(72) Inventors: Yikui Zhai, Guangdong (CN); Wenbo Deng, Guangdong (CN); Ying Xu, Guangdong (CN); Junying Gan, Guangdong (CN); Junying Zeng, Guangdong (CN); Zilu Ying, Guangdong (CN); Qirui Ke, Guangdong (CN); Wenlue Zhou, Guangdong (CN)

(73) Assignee: WUYI University, Guangdong (CN)

( * ) Notice: Subject to any disclaimer, the term of this patent is extended or adjusted under 35 U.S.C. 154(b) by 98 days.

(21) Appl. No.: 16/530,766

(22) Filed: Aug. 2, 2019

(65) Prior Publication Data

US 2021/0012146 A1    Jan. 14, 2021

(30) Foreign Application Priority Data

Jul. 12, 2019  (CN) .......................... 201910630658.3

(51) Int. Cl.
*G06K 9/00* (2006.01)
*G06K 9/62* (2006.01)
(Continued)

(52) U.S. Cl.
CPC ................ *G06K 9/629* (2013.01); *G01S 7/40* (2013.01); *G01S 13/9027* (2019.05);
(Continued)

(58) Field of Classification Search
CPC .... G06K 9/629; G06K 9/0063; G06K 9/6256; G06K 9/46; G06K 9/6262; G06K 9/3233;
(Continued)

(56) References Cited

U.S. PATENT DOCUMENTS

2015/0310615 A1\* 10/2015 Bulan .................. G06K 9/6267
                                                                  348/143
2016/0300375 A1\* 10/2016 Beckett ................. G06T 3/4092

FOREIGN PATENT DOCUMENTS

CN         104751183 A  \*  7/2015
CN         106156744 A  \*  11/2016
(Continued)

*Primary Examiner* — Matthew C Bella
*Assistant Examiner* — Kathleen M Broughton
(74) *Attorney, Agent, or Firm* — Farjami & Farjami LLP

(57) ABSTRACT

Disclosed are a method and an apparatus for multi-scale SAR image recognition based on attention mechanism. According to the method, a whole image recognition network is adjusted by training a SAR training image by an attention prediction subnet, a region-of-interest positioning subnet and an image classification subnet in combination with a network loss, which greatly improves a network performance; and in addition, an attention prediction map is generated by attention mechanism to position a most prominent feature part in the SAR image, which greatly eliminates a redundancy of image features in a machine vision, effectively determines a region-of-interest, reduces interference of image noises, greatly reduces an image processing time, improves a target recognition accuracy, is beneficial to next target positioning, and has a significant improvement on a network recognition speed integrally.

8 Claims, 4 Drawing Sheets

(51) Int. Cl.
- *G01S 13/90* (2006.01)
- *G01S 7/40* (2006.01)
- *G06K 9/32* (2006.01)
- *G06K 9/46* (2006.01)
- *G06T 3/40* (2006.01)

(52) U.S. Cl.
CPC ......... *G06K 9/0063* (2013.01); *G06K 9/3233* (2013.01); *G06K 9/46* (2013.01); *G06K 9/6256* (2013.01); *G06K 9/6262* (2013.01); *G06T 3/40* (2013.01); *G06T 2207/20081* (2013.01)

(58) Field of Classification Search
CPC ......... G01S 13/9027; G01S 7/40; G06T 3/40; G06T 2207/20081
See application file for complete search history.

(56) References Cited

FOREIGN PATENT DOCUMENTS

| | | | | |
|---|---|---|---|---|
| CN | 107423734 A | * | 12/2017 | |
| CN | 108872988 A | * | 11/2018 | |
| WO | WO-2017160273 A1 | * | 9/2017 | ............. G01V 1/307 |

* cited by examiner

METHOD AND APPARATUS FOR MULTI-SCALE SAR IMAGE RECOGNITION BASED ON ATTENTION MECHANISM

CROSS REFERENCE TO RELATED APPLICATION

This application claims the benefit of CN patent application No. 201910630658.3 filed on Jul. 12, 2019, the entire disclosures of which are hereby incorporated herein by reference.

TECHNICAL FIELD

The present disclosure relates to the field of image processing, and more particularly, to a method and an apparatus for multi-scale SAR image recognition based on attention mechanism.

BACKGROUND

Synthetic Aperture Radar (SAR) is widely used in military, disaster monitoring and other fields due to its advantages of all weather and long-distance detection, multiple angles and multiple resolutions, thus detecting and positioning different targets. Meanwhile, SAR image recognition is affected by inherent ambiguity of SAR imaging, insufficient target data and other factors, resulting in insufficient target recognition accuracy in classification recognition. This greatly increases the difficulty of SAR image recognition, resulting in long processing time and low accuracy of SAR image processing.

SUMMARY

The present disclosure is intended to solve at least one of the technical problems in the prior art, and provides a method and an apparatus for multi-scale SAR image recognition based on attention mechanism to effectively improve a SAR image recognition performance by attention mechanism.

A technical solution employed by the present disclosure to solve the technical problems thereof is as follows.

According to a first aspect, the present disclosure provides a method for multi-scale SAR image recognition based on attention mechanism, which comprises the following steps of:

a training step: inputting a SAR training image to train and adjust an original image recognition network, wherein the image recognition network comprises an attention prediction subnet, a region-of-interest positioning subnet and an image classification subnet connected in sequence; and a classification step: inputting a SAR image to be detected to the trained image recognition network to process and output a classification result;

the training step comprising:

attention prediction: processing a SAR training image by the attention prediction subnet to obtain an attention prediction map, and calculating an attention prediction loss;

preliminary positioning: processing the SAR training image by the region-of-interest positioning subnet in combination with the attention prediction map to obtain a preliminarily positioning SAR image, and calculating a region-of-interest positioning loss;

classification training: processing the preliminarily positioning SAR image by the image classification subnet to output a classification result, and calculating a classification loss; and network adjustment: calculating a network loss according to the attention prediction loss, the region-of-interest positioning loss and the classification loss, and adjusting the image recognition network according to the network loss.

According to the first aspect of the present disclosure, the method for multi-scale SAR image recognition based on attention mechanism further comprises the following step of:

positioning optimization: performing region framing and screening on the preliminarily positioning SAR image after obtaining the preliminarily positioning SAR image to obtain an optimized positioning image with a candidate frame region feature, wherein the optimized positioning image is used as an input of the image classification subnet in the classification training step.

According to the first aspect of the present disclosure, the attention prediction step specifically comprises:

extracting RGB channel information of the SAR training image and expressing the RGB channel information by a tensor, and processing the SAR training image by eight building blocks according to the tensor to obtain a multi-scale feature;

matching a weight for the SAR training image according to the multi-scale feature to obtain a positioning feature;

performing normalization processing and deconvolution processing on the positioning feature in combination with the SAR image to obtain the attention prediction map; and calculating the attention prediction loss.

According to the first aspect of the present disclosure, the preliminary positioning step specifically comprises:

masking the SAR training image by the attention prediction map in form of a heat map to generate a mask and extracting a mask feature;

obtaining the preliminarily positioning SAR image by aligning a region-of-interest; and calculating the region-of-interest positioning loss.

According to the first aspect of the present disclosure, the network loss is $Loss = \alpha \cdot Loss_a + \beta \cdot Loss_f + \gamma \cdot Loss_c$, $Loss_a$, $Loss_f$ and $Loss_c$ are the attention prediction loss, the region-of-interest positioning loss and the classification loss respectively, and $\alpha$, $\beta$ and $\gamma$ are hyper-parameters that balance among the attention prediction loss, the region-of-interest positioning loss and the classification loss.

According to a second aspect, the present disclosure provides an apparatus applying the method for multi-scale SAR image recognition based on attention mechanism, which comprises:

a training module configured to input a SAR training image to train and adjust an original image recognition network, wherein the image recognition network comprises an attention prediction subnet, a region-of-interest positioning subnet and an image classification subnet connected in sequence;

and a classification module connected with the training module and configured to input a SAR image to be detected to the image recognition network trained by the training module to process and output a classification result;

the training module specifically comprising:

an attention prediction module configured to process the SAR training image by an attention prediction subnet to obtain an attention prediction map, and calculate an attention prediction loss;

a preliminary positioning module configured to process the SAR training image by a region-of-interest positioning subnet in combination with the attention prediction map to obtain a preliminarily positioning SAR image, and calculate a region-of-interest positioning loss;

a classification training module configured to process the preliminarily positioning SAR image by the image classification subnet to output the classification result, and calculate a classification loss; and a network adjustment module configured to calculate a network loss according to the attention prediction loss, the region-of-interest positioning loss and the classification loss, and adjust the image recognition network according to the network loss.

The apparatus according to the second aspect of the present disclosure further comprises: a positioning optimization module connected with the classification training module and configured to perform region framing and screening on the preliminarily positioning SAR image to obtain an optimized positioning image with a candidate frame region feature; wherein the optimized positioning image is used as an input of the classification training module.

The technical solutions provided by the present disclosure at least have the following beneficial effects: the SAR image is processed by the attention prediction subnet to generate the attention prediction map, and the most significant feature part in the SAR image is positioned by the attention prediction subnet, which greatly eliminates a redundancy of image features in a machine vision, the region-of-interest of the target is effectively determined by the attention prediction subnet, which reduces interference of image noises, greatly reduces an image processing time, improves a target recognition accuracy, is beneficial to next target positioning, and has a significant improvement on a network recognition speed integrally.

BRIEF DESCRIPTION OF THE DRAWINGS

The present disclosure is further described below with reference to the drawings and the embodiments.

DETAILED DESCRIPTION

Figure 1:
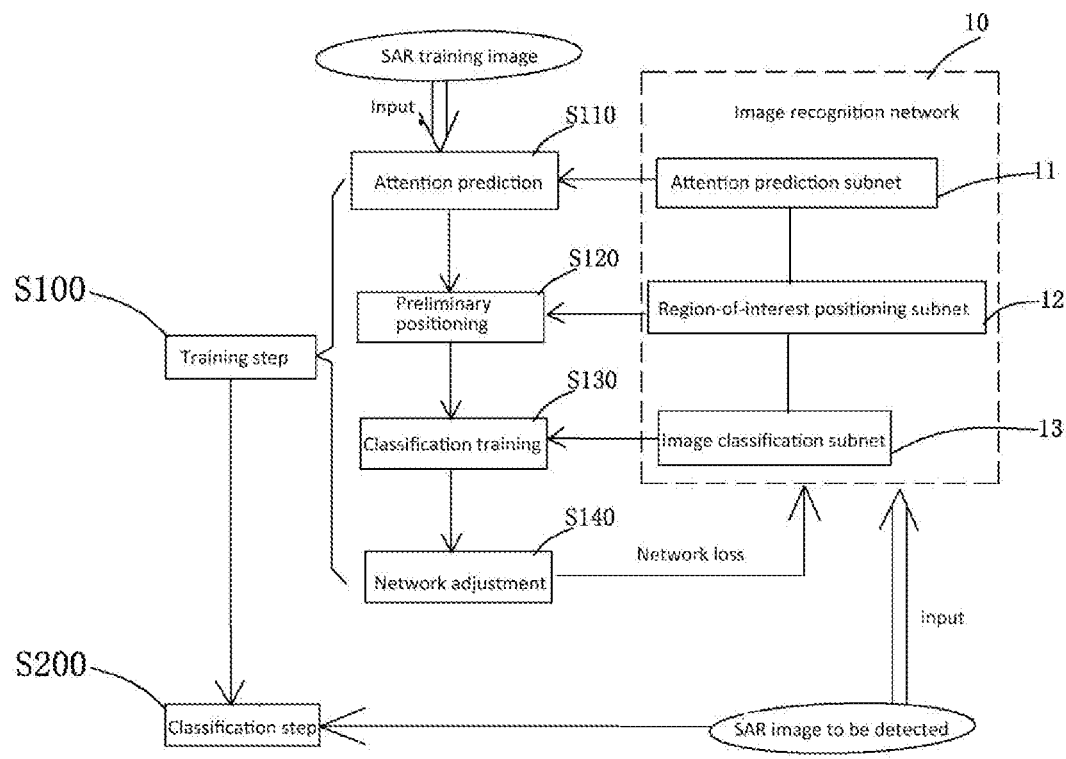
FIG. 1 is a flow chart of a method for multi-scale SAR image recognition based on attention mechanism according to an embodiment of the present disclosure.

The example embodiments of the disclosure are described in detail. The preferred embodiments of the disclosure are shown in the drawings, and the purpose of the drawings is to supplement the description in the written part of the description with graphics, so that people can intuitively and vividly understand each technical feature and an overall technical solution of the disclosure, but it cannot be understood as limiting the protection scope of the disclosure.

In the description of the disclosure, unless otherwise clearly defined, words such as setting, installation, connection, etc., should be understood broadly, and those skilled in the art can reasonably determine the specific meanings of the above words in the disclosure with reference to the specific contents of the technical solution.

Referring to FIG. 1, an embodiment of the present disclosure provides a method for multi-scale SAR image recognition based on attention mechanism, which comprises the following steps of:

step S100: a training step: inputting a SAR training image to train and adjust an original image recognition network 10, wherein the image recognition network 10 comprises an attention prediction subnet 11, a region-of-interest positioning subnet 12 and an image classification subnet 13 connected in sequence; and step S200: a classification step: inputting a SAR image to be detected to the trained image recognition network 10 to process and output a classification result;

the step S100 comprising:

the step S110: attention prediction: processing a SAR training image by the attention prediction subnet 11 to obtain an attention prediction map, and calculating an attention prediction loss;

the step S120: preliminary positioning: processing the SAR training image by the region-of-interest positioning subnet 12 in combination with the attention prediction map to obtain a preliminarily positioning SAR image, and calculating a region-of-interest positioning loss;

the step S130: classification training: processing the preliminarily positioning SAR image by the image classification subnet 13 to output a classification result, and calculating a classification loss; and the step S140: network adjustment: calculating a network loss according to the attention prediction loss, the region-of-interest positioning loss and the classification loss, and adjusting the image recognition network 10 according to the network loss.

In the embodiment, a large number of SAR training images are input to train and adjust the original image recognition network 10 to improve a recognition degree of the image recognition network 10; and then the SAR image to be detected is recognized and classified. The SAR image is processed by the attention prediction subnet 11 to generate the attention prediction map, and the most significant feature part in the SAR image is positioned by the attention prediction subnet 11, which greatly eliminates a redundancy of image features in a machine vision, the region-of-interest of the target is effectively determined by the attention prediction subnet 11, which reduces interference of image noises, greatly reduces an image processing time, improves a target recognition accuracy, and is beneficial to next target positioning.

Figure 2:
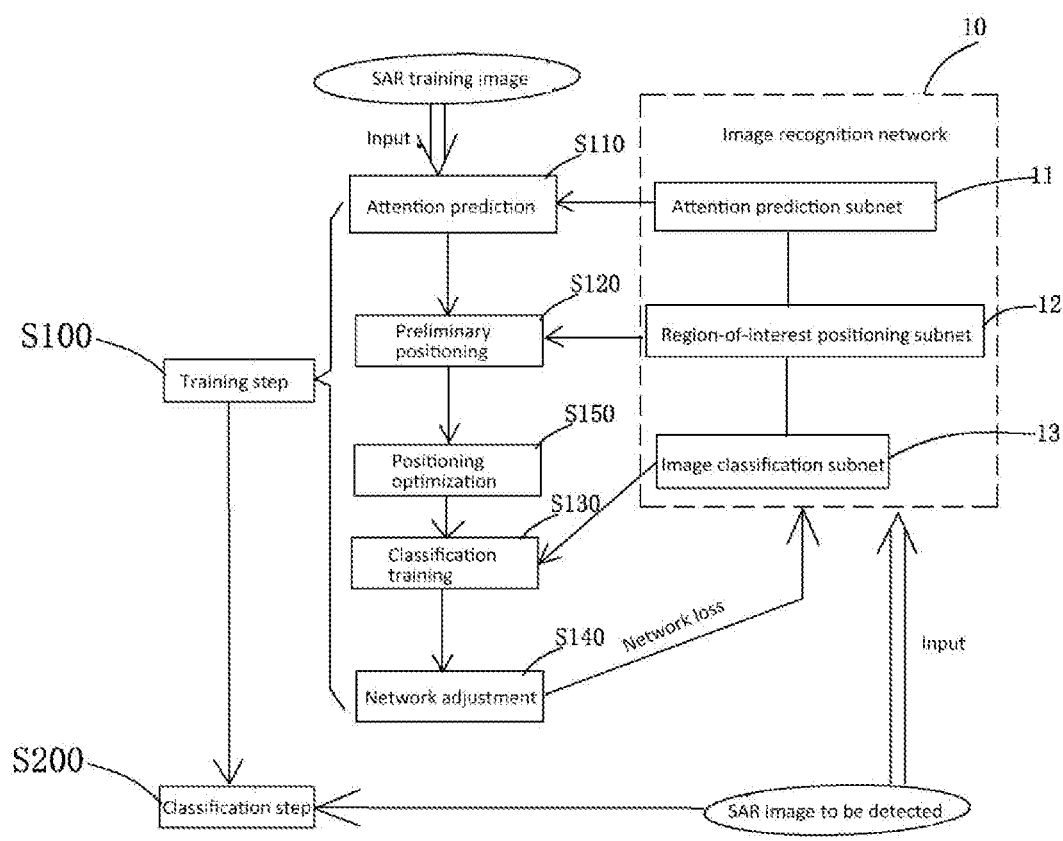
FIG. 2 is a flow chart of a method for multi-scale SAR image recognition based on attention mechanism according to another embodiment of the present disclosure.
Figure 3:
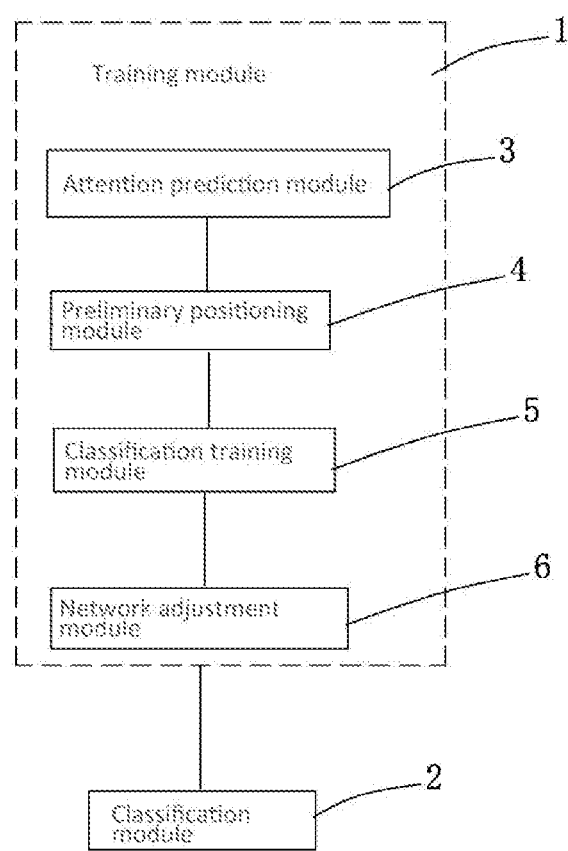
FIG. 3 is a structure schematic diagram of an apparatus applying the method for multi-scale SAR image recognition based on attention mechanism according to an embodiment of the present disclosure.
Figure 4:
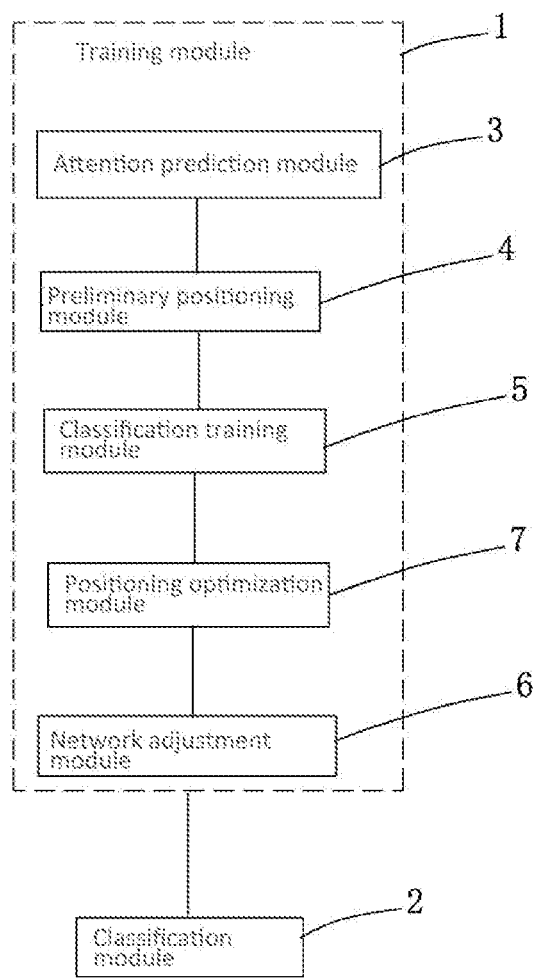
FIG. 4 is a structure schematic diagram of an apparatus applying the method for multi-scale SAR image recognition based on attention mechanism according to another embodiment of the present disclosure.

Referring to FIG. 2, a method for multi-scale SAR image recognition based on attention mechanism according to another embodiment further comprises the following steps of:

step S150: positioning optimization: performing region framing and screening on the preliminarily positioning SAR image after obtaining the preliminarily positioning SAR image to obtain an optimized positioning image with a candidate frame region feature; more specifically, passing the preliminarily positioning SAR image through a region candidate frame network to generate a detection frame region; comparing an Intersection over Union of the detection frame region and a true value region with a threshold, and outputting a positive sample image in which the Intersection over Union of the detection frame region and the true value region is greater than the threshold; and screening k optimized positioning images with a candidate frame region feature and a maximum confidence value by using a non-maximum suppression method. In the next classification training step, the optimized positioning image is used as an input of the image classification subnet 13. The preliminarily positioning SAR image is further screened and optimized to improve the classification accuracy.

Further, the step S110 specifically comprises the following steps.

In step S111, RGB channel information of the SAR training image is extracted and expressed by a tensor, and the SAR training image is processed by eight building blocks according to the tensor to obtain four multi-scale features, with sizes of 64×64, 32×32, 16×16 and 8×8 respectively. Specifically, the tensor has a size of 128×128×3.

In step S112, a weight is matched for the SAR training image according to the multi-scale feature to obtain a positioning feature; in order to selectively screen a small amount of important information from a large amount of image information, ignore most unimportant information, and pay attention on these important information, different attention weights are assigned to the image with the multi-scale feature output by each building block, and attention is paid on the concerned part in the SAR images, wherein the focusing process is embodied in the calculation of a weight coefficient. When the weight is larger, more attentions are paid on the information, i.e. the weight represents the importance of the information. The positioning feature is calculated according to the following formula:

$$\text{Attention} = \sum_{i=1}^{Lx} \text{similarity}(Query, Key_i) * Value_i,$$

wherein a first process is to calculate the weight coefficient according to a parameter Query and a multi-scale feature $Key_i$, while a second process is to perform weighted sum on an image region $Value_i$ according to the weight coefficient. The first process can be further subdivided into two stages: a similarity or a correlation between the parameter Query and the multi-scale feature $Key_i$ is calculated according to the parameter Query and the multi-scale feature $Key_i$ in the first stage; and an original score in the first stage is normalized in the second stage.

In step S113, normalization processing and deconvolution processing are performed on the positioning feature in combination with the SAR image to obtain the attention prediction map.

In step S114, the attention prediction loss is calculated. The attention prediction loss is $$Loss_a = \frac{1}{I \cdot J} \sum_{i=1}^{I} \sum_{j=1}^{J} A_{ij} \log\left(\frac{A_{ij}}{\hat{A}_{ij}}\right),$$

wherein $A_{ij}$ refers to each element in the attention prediction map, $\hat{A}_{ij}$ refers to the attention prediction map, i and j refers to a length and a width of the attention prediction map, and I and J refer to sets of i and j respectively.

Further, the step S120 specifically comprises:

step S121: masking the SAR training image by the attention prediction map $\hat{V}$ in form of a heat map to generate a mask and extracting a mask feature F', with a masking process of $F'=F\odot\{(1-\theta)\hat{V}\oplus\theta\}$, wherein θ is a threshold for controlling the mask, and F is a positioning feature;

step S122: obtaining the preliminarily positioning SAR image by aligning a region-of-interest, which can effectively suppress a redundant feature unrelated to SAR image classification and detection, and highlight the region-of-interest; and step S123: calculating the region-of-interest positioning loss, wherein the region-of-interest positioning loss is $$Loss_c = l\log\left(\frac{1}{1+e^{-\hat{l}_c}}\right) + (1-l)\log\left(1 - \frac{1}{1+e^{-\hat{l}_c}}\right),$$

and 1 is a prediction tag of the attention prediction map.

Further, in the step S130, the image classification subnet 13 is composed of a 7×7 convolution layer, a maximum pool layer, four multi-scale modules and two fully connected layers. Four convolution layer channels C1, C2, C3 and C4 with different core sizes are connected by the four multi-scale modules to extract the multi-scale feature, wherein C1 and C3 have a size of 3×3, C2 has a size of 5×5, and C4 has a size of 7×7; and finally, the two fully connected layers are applied to output the classification result. In addition, the classification loss is $$Loss_f = l\log\left(\frac{1}{1+e^{-\hat{l}_f}}\right) + (1-l)\log\left(1 - \frac{1}{1+e^{-\hat{l}_f}}\right),$$

and a calculation mechanism is the same as the region-of-interest positioning loss.

Further, in the step S140, the network loss is $Loss = \alpha \cdot Loss_a + \beta \cdot Loss_f + \gamma \cdot Loss_c$, wherein $Loss_a$, $Loss_f$ and $Loss_c$ are the attention prediction loss, the region-of-interest positioning loss and the classification loss respectively, and α, β and γ are hyper-parameters that balance among the attention prediction loss, the region-of-interest positioning loss and the classification loss. It should be noted that in an early stage of training, $\alpha \gg \beta = \gamma$ is set to accelerate a convergence speed of the attention prediction subnet 11; and in middle and later stages of training, $\alpha \ll \beta = \gamma$ is set to minimize the region-of-interest positioning loss and the classification loss, and improve a convergence of attention prediction.

Another embodiment of the present disclosure provides an apparatus applying the method for multi-scale SAR image recognition based on attention mechanism, which comprises:

a training module 1 configured to input a SAR training image to train and adjust an original image recognition network 10, wherein the image recognition network 10 comprises an attention prediction subnet 11, a region-of-interest positioning subnet 12 and an image classification subnet 13 connected in sequence;

and a classification module 2 connected with the training module 1 and configured to input a SAR image to be detected to the image recognition network 10 trained by the training module 1 to process and output a classification result;

the training module 1 specifically comprising:

an attention prediction module 3 configured to process the SAR training image by an attention prediction subnet 11 to obtain an attention prediction map, and calculate an attention prediction loss;

a preliminary positioning module 4 configured to process the SAR training image by a region-of-interest positioning subnet 12 in combination with the attention prediction map to obtain a preliminarily positioning SAR image, and calculate a region-of-interest positioning loss;

a classification training module 5 configured to process the preliminarily positioning SAR image by the image classification subnet 13 to output the classification result, and calculate a classification loss; and a network adjustment module 6 configured to calculate a network loss according to the attention prediction loss, the region-of-interest positioning loss and the classification loss, and adjust the image recognition network 10 according to the network loss.

The apparatus according to another embodiment further comprises: a positioning optimization module 7 connected with the classification training module 5 and configured to perform region framing and screening on the preliminarily positioning SAR image to obtain an optimized positioning image with a candidate frame region feature; wherein the optimized positioning image is used as an input of the classification training module 5.

Another embodiment of the present disclosure further provides an apparatus, which comprises a processor and a memory for connecting to the processor, wherein the memory stores an instruction executable by the processor, and the instruction is executed by the processor to enable the processor to execute the method for multi-scale SAR image recognition based on attention mechanism above.

Another embodiment of the present disclosure provides a storage medium storing a computer-executable instruction, wherein the computer-executable instruction is configured to make a computer execute the method for multi-scale SAR image recognition based on attention mechanism above.

The foregoing is only preferred embodiments of the disclosure, but the present disclosure is not limited to the embodiments above. Any technical effect of the disclosure implemented by using the same means shall fall within the protection scope of the disclosure.

What is claimed is:

1. A method for multi-scale synthetic aperture radar (SAR) image recognition based on attention mechanism, comprising:
    inputting a SAR training image to train and adjust an original image recognition network, wherein the original image recognition network comprises an attention prediction subnet, a region-of-interest positioning subnet and an image classification subnet connected in sequence; and
    inputting a SAR image to be detected to the trained image recognition network to process and output a classification result;
    wherein training and adjusting the original image recognition network comprise:
        processing the SAR training image by the attention prediction subnet to obtain an attention prediction map, and calculating an attention prediction loss;
        processing the SAR training image by the region-of-interest positioning subnet in combination with the attention prediction map to obtain a preliminary positioning SAR image, and calculating a region-of-interest positioning loss;
        processing the preliminary positioning SAR image by the image classification subnet to output a classification result, and calculating a classification loss; and
        calculating a network loss according to the attention prediction loss, the region-of-interest positioning loss and the classification loss, and adjusting the original image recognition network according to the network loss, wherein the network loss is $Loss = \alpha \cdot Loss_a + \beta \cdot Loss_f + \gamma \cdot Loss_c$, wherein $Loss_a$ is the attention prediction loss, $Loss_f$ is the region-of-interest positioning loss and $Loss_c$ is the classification loss, and wherein $\alpha$, $\beta$ and $\gamma$ are hyper-parameters that balance among the attention prediction loss, the region-of-interest positioning loss and the classification loss.

2. The method for multi-scale SAR image recognition based on attention mechanism according to claim 1, further comprising:
    performing region framing and screening on the preliminary positioning SAR image after obtaining the preliminary positioning SAR image to obtain an optimized positioning image with a candidate frame region feature, wherein the optimized positioning image is used as an input of the image classification subnet in the classification training.

3. The method for multi-scale SAR image recognition based on attention mechanism according to claim 1, wherein processing the SAR training image by the attention prediction subnet to obtain the attention prediction map, and calculating the attention prediction loss comprise:
    extracting RGB channel information of the SAR training image and expressing the RGB channel information by a tensor, and processing the SAR training image by eight building blocks according to the tensor to obtain a multi-scale feature;
    matching a weight for the SAR training image according to the multi-scale feature to obtain a positioning feature;
    performing normalization processing and deconvolution processing on the positioning feature in combination with the SAR image to obtain the attention prediction map; and
    calculating the attention prediction loss.

4. The method for multi-scale SAR image recognition based on attention mechanism according to claim 2, wherein processing the SAR training image by the attention prediction subnet to obtain the attention prediction map, and calculating the attention prediction loss comprise:
    extracting RGB channel information of the SAR training image and expressing the RGB channel information by a tensor, and processing the SAR training image by eight building blocks according to the tensor to obtain a multi-scale feature;
    matching a weight for the SAR training image according to the multi-scale feature to obtain a positioning feature;
    performing normalization processing and deconvolution processing on the positioning feature in combination with the SAR image to obtain the attention prediction map; and
    calculating the attention prediction loss.

5. The method for multi-scale SAR image recognition based on attention mechanism according to claim 1, wherein obtaining the preliminary positioning SAR image comprises:
    masking the SAR training image by the attention prediction map in form of a heat map to generate a mask and extracting a mask feature;
    aligning a region-of-interest; and
    calculating the region-of-interest positioning loss.

6. The method for multi-scale SAR image recognition based on attention mechanism according to claim 2, wherein obtaining the preliminary positioning SAR image comprises:

masking the SAR training image by the attention prediction map in form of a heat map to generate a mask and extracting a mask feature;

aligning a region-of-interest; and calculating the region-of-interest positioning loss.

7. An apparatus for multi-scale synthetic aperture radar (SAR) image recognition based on, comprising:

a training module configured to input a SAR training image to train and adjust an original image recognition network, wherein the original image recognition network comprises an attention prediction subnet, a region-of-interest positioning subnet and an image classification subnet connected in sequence; and a classification module connected with the training module and configured to input a SAR image to be detected to the image recognition network trained by the training module to process and output a classification result;

the training module comprising:

an attention prediction module configured to process the SAR training image by an attention prediction subnet to obtain an attention prediction map, and calculate an attention prediction loss;

a preliminary positioning module configured to process the SAR training image by a region-of-interest positioning subnet in combination with the attention prediction map to obtain a preliminary positioning SAR image, and calculate a region-of-interest positioning loss;

a classification training module configured to process the preliminary positioning SAR image by the image classification subnet to output the classification result, and calculate a classification loss; and a network adjustment module configured to calculate a network loss according to the attention prediction loss, the region-of-interest positioning loss and the classification loss, and adjust the original image recognition network according to the network loss, wherein the network loss is Loss=$\alpha \cdot Loss_a + \beta \cdot Loss_f + \gamma \cdot Loss_c$, wherein $Loss_\alpha$ is the attention prediction loss, $Loss_f$ is the region-of-interest positioning loss and $Loss_c$ is the classification loss, and wherein $\alpha$, $\beta$ and $\gamma$ are hyper-parameters that balance among the attention prediction loss, the region-of-interest positioning loss and the classification loss.

8. The apparatus according to claim 7, further comprising:

a positioning optimization module connected with the classification training module and configured to perform region framing and screening on the preliminary positioning SAR image to obtain an optimized positioning image with a candidate frame region feature; wherein the optimized positioning image is used as an input of the classification training module.

* * * * *